(12) United States Patent
Brummer et al.

(10) Patent No.: US 8,670,618 B2
(45) Date of Patent: Mar. 11, 2014

(54) SYSTEMS AND METHODS FOR EXTRACTING PEDIGREE AND FAMILY RELATIONSHIP INFORMATION FROM DOCUMENTS

(75) Inventors: Andre Brummer, Provo, UT (US); Sean Roylance, Elk Ridge, UT (US)

(73) Assignee: Youwho, Inc., Provo, UT (US)

( * ) Notice: Subject to any disclaimer, the term of this patent is extended or adjusted under 35 U.S.C. 154(b) by 724 days.

(21) Appl. No.: 12/859,120

(22) Filed: Aug. 18, 2010

(65) Prior Publication Data

US 2012/0045150 A1  Feb. 23, 2012

(51) Int. Cl.
*G06K 9/46* (2006.01)
*G06K 9/66* (2006.01)

(52) U.S. Cl.
USPC .......................................... 382/190; 358/470

(58) Field of Classification Search
None
See application file for complete search history.

(56) References Cited

U.S. PATENT DOCUMENTS

| | | | | |
|---|---|---|---|---|
| 5,594,638 | A * | 1/1997 | Iliff | 705/3 |
| 6,104,500 | A * | 8/2000 | Alam et al. | 358/1.15 |
| 6,631,404 | B1 * | 10/2003 | Philyaw | 709/217 |
| 6,636,892 | B1 * | 10/2003 | Philyaw | 709/217 |
| 6,701,369 | B1 * | 3/2004 | Philyaw | 709/229 |
| 6,820,075 | B2 | 11/2004 | Shanahan et al. | |
| 6,917,708 | B2 * | 7/2005 | Goodman et al. | 382/186 |
| 7,377,427 | B2 * | 5/2008 | Murata | 235/383 |
| 7,505,163 | B2 * | 3/2009 | Hart et al. | 358/1.15 |
| 7,853,459 | B2 * | 12/2010 | Kay | 705/3 |
| 8,074,185 | B2 | 12/2011 | Sherwood et al. | |
| 8,099,237 | B2 * | 1/2012 | Mays et al. | 701/434 |
| 8,139,870 | B2 * | 3/2012 | Kato | 382/229 |
| 8,150,156 | B2 * | 4/2012 | Geva et al. | 382/175 |
| 8,156,158 | B2 * | 4/2012 | Rolls et al. | 707/803 |
| 8,180,654 | B2 * | 5/2012 | Berkman et al. | 705/3 |
| 8,228,542 | B2 * | 7/2012 | Coley et al. | 358/1.15 |
| 8,229,176 | B2 * | 7/2012 | Seegers et al. | 382/113 |
| 8,315,484 | B2 * | 11/2012 | Meyer et al. | 382/310 |
| 8,351,703 | B2 * | 1/2013 | Jain et al. | 382/190 |
| 8,379,912 | B2 * | 2/2013 | Yadid et al. | 382/100 |
| 8,429,154 | B2 * | 4/2013 | Takeya | 707/723 |
| 2001/0033694 | A1 * | 10/2001 | Goodman et al. | 382/229 |
| 2002/0123907 | A1 * | 9/2002 | Strayer | 705/2 |
| 2004/0181747 | A1 * | 9/2004 | Hull et al. | 715/500.1 |
| 2005/0149538 | A1 | 7/2005 | Singh et al. | |
| 2006/0253418 | A1 | 11/2006 | Charnock | |
| 2007/0065017 | A1 * | 3/2007 | Kotwaliwale et al. | 382/226 |
| 2007/0192143 | A1 * | 8/2007 | Krishnan et al. | 705/3 |
| 2008/0162393 | A1 * | 7/2008 | Iliff | 706/46 |
| 2008/0212877 | A1 | 9/2008 | Franco | |
| 2009/0067747 | A1 * | 3/2009 | Inamoto et al. | 382/276 |
| 2009/0313495 | A1 * | 12/2009 | Krishnan et al. | 713/600 |

(Continued)

OTHER PUBLICATIONS

PCT International Search Report for International Application No. PCT/US2011/042766, mailed Oct. 28, 2011 (2 pp.).

*Primary Examiner* — Manav Seth (74) *Attorney, Agent, or Firm* — Holland & Hart (57) ABSTRACT

A computer-implemented method for extracting information about individuals from a family history document includes applying optical character recognition (OCR) to a digital image of a family history document to create an OCR copy, identifying a person's name in the digital image, extracting name data and related information from the OCR copy representing the name, identifying a family relationship indicator corresponding to the identified person's name in the digital image, confirming accuracy of the extracted name data, and publishing the extracted name data and related information in a searchable format.

19 Claims, 9 Drawing Sheets

(56) References Cited

U.S. PATENT DOCUMENTS

2010/0049736 A1* 2/2010 Rolls et al. ............... 707/103 R
2010/0149606 A1* 6/2010 Handley et al. ............... 358/474
2010/0325690 A1* 12/2010 Suzuki et al. ............... 726/1
2010/0331043 A1* 12/2010 Chapman et al. ........... 455/556.1
2011/0096983 A1* 4/2011 Jensen ............... 382/161
2012/0240038 A1* 9/2012 Curtis ............... 715/256

* cited by examiner

SYSTEMS AND METHODS FOR EXTRACTING PEDIGREE AND FAMILY RELATIONSHIP INFORMATION FROM DOCUMENTS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

In the genealogy industry, it has become useful to extract information from various types of documents and records into a format that can be easily discovered using modern computerized search techniques. This approach has become popular for a variety of record types including census records, birth certificates, and military records.

One record type that usually is not extracted is published family history documents. Information in family history documents usually is not predictably organized in a way that is easily and affordably extracted using techniques typical in the industry. As a result, many published family history collections have been processed only with basic optical character recognition (OCR) software. This leaves the data with a large number of inaccuracies. More importantly, useful inferred information such as presuming the children to have the same surname as their father and relationship information cannot be effectively captured. The OCR data representing the family history document can be searched in a generic fashion using typical free-form document search techniques, but the amount and type of data that can be used effectively as part of the search is limited and typically highly unreliable.

Some effort has been made to create a completely automated relationship information extraction process for family history documents without any human interaction during the extraction process. This effort has not been seriously pursued due to the extreme inaccuracies that result from such an approach.

SUMMARY

One aspect of the present disclosure relates to a computer-implemented method for extracting information about individuals from a family history document. The method includes applying optical character recognition (OCR) to a digital image of a family history document to create an OCR copy, identifying a person's name in the digital image, extracting name data from the OCR copy representing the name, confirming accuracy of the extracted name data, and publishing the extracted name data in a searchable format.

The method may further include identifying a family relationship indicator corresponding to the identified name in the digital image, and extracting relationship data from the OCR copy representing the relationship indicator. The method may also include identifying at least one of a birth date or place, a death date or place, and a marriage date or place corresponding to the identified person's name in the digital image, and extracting data from the OCR copy representing the identified birth, death, or marriage information.

The method may include automatically associating at least one of a birth date or place, a death date or place, and a marriage date or place with the identified name. The method may also include using predictive algorithms to automatically associate at least one of a birth date or place, a death date or place, and a marriage date or place with the identified name.

Extracting name data according to the method may include highlighting the identified name, manually selecting the highlighted name, and mapping to data in the OCR copy representing the identified name. The method may include manually correcting incorrect OCR characters from the OCR copy. The method may further include comparing the identified name with a database of names to assess correct spelling of the name, wherein the names in the database are organized by at least one of a historical time period, a gender, a location, and other criteria. The method may include identifying errors in at least one of the birth date, death date and marriage date by comparison between at least two of the birth date, death date and marriage date.

Another aspect of the present disclosure relates to a computing device configured to extract personal information from a family history document. The computing device includes a processor, memory in electronic communication with the processor, an image processing module, and a pedigree module. The image processing module may be configured to digitize a family history document to create a digital image, wherein the digital image includes information about individuals. The image processing module may also be configured to conduct optical character recognition (OCR) on the digital image and create an OCR copy. The pedigree module may be configured to create an extracted content file by correcting OCR errors, aggregating information about the individuals from the digital image, identifying family relationships between individuals included in the digital image, and providing the extracted content file in a searchable format.

The pedigree module may be configured to identify potential OCR errors and suggest possible corrections of the OCR errors. The pedigree module may be configured to automatically aggregate at least some information about the individuals related to at least one of birth, death, and marriage events. The pedigree module may be configured to present a list of possible relationships between two of the individuals, and a user selects a relationship from the list of possible relationships.

The computing device may further include a user interface configured to display the digital image, and a plurality of entry fields for a user to enter information from the displayed digital image. The computing device may also include a user interface configured to display the digital image and a plurality of entry fields, wherein information about an individual from the displayed digital image is manually or automatically entered into the entry fields upon selection of the individual from the displayed digital image. The user interface may be configured to display the digital image and a plurality of entry fields, wherein upon manual entry of an individual from the displayed digital image into one of the entry fields, the pedigree module automatically enters information about the individual from the digital image into other of the entry fields.

A further aspect of the present disclosure relates to a computer-program product for extracting personal information from a family history document, wherein the computer-program product includes a computer-readable medium having instructions thereon. The instructions include code programmed to identify a person's name in a digital image of a family history document, and code programmed to extract data for the person's name from an optical character recognition (OCR) copy of the digital image. The data may include at least a family relationship indicator and at least one of a birth date, a death date, and a marriage date. The instructions may also include code programmed to publish the extracted data in a searchable format.

Another aspect of the present disclosure relates to a computer-implemented method for extracting personal information from a digital family history document. The method includes displaying an image of the digital family history document, loading an optical character recognition (OCR) copy of the digital family history document, manually extracting data from the image with data including at least a name for an individual identified in the image, automatically extracting at least some data from the image that is mapped to the OCR copy, and providing the extracted data in a searchable format.

The manually extracted data may include at least one of a family relationship, birth information, death information, and marriage information for the individual identified in the image. Automatically extracting may include marking characters in the image, identifying the type of information represented by the marked characters, mapping the marked characters to data in the OCR copy, and filling a field with data from the OCR copy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

One aspect of the present disclosure relates to systems and methods that help capture names from a published family history document. Another aspect of the present disclosure related to extracting relationship information between individuals listed in a published family history document. These systems and methods may also capture inferred information that has previously been relatively inaccessible through traditional OCR methods in a published family history document, and make that inferred information usefully available to genealogists. While some effort has been made by others to create a completely automated system that generates relationship information (i.e., husband/wife, parent/child) without any human interaction during the extraction process, this effort has not been seriously pursued due to the extreme inaccuracies that result from such an automated approach. The present disclosure is directed to systems and methods that provide at least some manual or human interaction in the extraction process. This manual interaction may be useful to confirm proper relationships, correct inaccuracies in OCR characters, and confirm data that has been automatically extracted from a published family history.

A published family history or family history document may be any type of printed or published document that includes at least some family relationship information. In some examples, the family history document may include both family history information and at least some information concerning one or more individuals listed in the family history document. The individual information may include, for example, birth, death, and marriage information (i.e., a birth date and location). A family history document may be formatted in a narrative, paragraph format. Other types of family history documents may be arranged as, for example, a pedigree chart, family tree, outline or bullet format.

In order to provide some searchability of a family history document, the family history document is converted into a digital format. The digital format may be acquired by creating a digital image using any type of scanning technique. Some example scanning techniques include flat bed scanning, digital camera photography, and digital wand scanning. The digital image may be stored as, for example, a .jpg, .pdf, .tiff, or .bmp format file.

After the family history document has been converted to a digital format or digital image (also referred to as digitizing, electronically scanning and digital formatting), an optical character recognition (OCR) process may be used to automatically extract characters (i.e., numbers and letters), words and phrases in a format that can be searchable. The OCR data can be stored as an OCR copy, OCR file, or OCR format that can be saved, stored, uploaded, or manipulated in some way to extract information represented in the family history document.

As noted above, utilizing OCR technology on a digital family history document is inherently inaccurate, typically full of errors, and is easily prone to incorrect searches when searching the OCR copy by keyword or otherwise. In essence, the OCR copy representing information from the family history document is only marginally useful to someone searching for information about individuals in the family history document. A completely manual process is time intensive and, as a result, usually cost prohibitive.

One aspect of the present disclosure relates to improving the content of the OCR copy in at least the following three ways: 1) correct misspellings, omissions and other errors from the OCR process, 2) aggregate multiple pieces of information about a specific individual from the family history document, and 3) identify relationships between individuals in the family history document. These steps are accomplished, at least in part, by a human-operated program or system that permits the operator to, for example, correct errors in the OCR copy, aggregate at least some of the information about individuals listed in the family history document, and identify or confirm family relationships between individuals listed in the family history document. The extracted information may be collected automatically by the systems and methods, or at least partially manually by an operator operating the system or method, and may be made available for research, data mining purposes, and searching generally.

Figure 1:
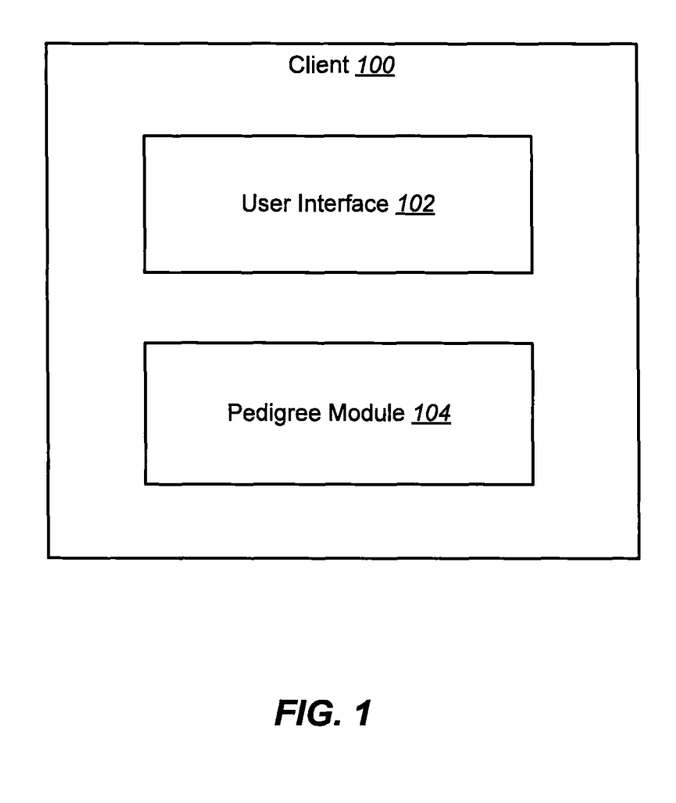
FIG. 1 is a block diagram illustrating one embodiment of an client having a user interface and pedigree module in which the present systems and methods may be implemented.

FIG. 1 is a block diagram illustrating one embodiment of a client server, client system, or client device 100 in which the present systems and methods may be implemented. In one example, client 100 includes a user interface 102 and a pedigree module 104. The user interface 102 may provide at least some user interaction with operability of the pedigree module 104. A user may provide instructions, enter data and interface generally with the pedigree module via the user interface 102. The pedigree module 104 may provide at least some automatic functionality based on other inputs and operations separate and distinct from those occurring at the user interface 102. The client 100 may include a number of additional modules, interfaces, systems, methods, databases, features and functionality in addition to that illustrated in FIG. 1.

Figure 2:
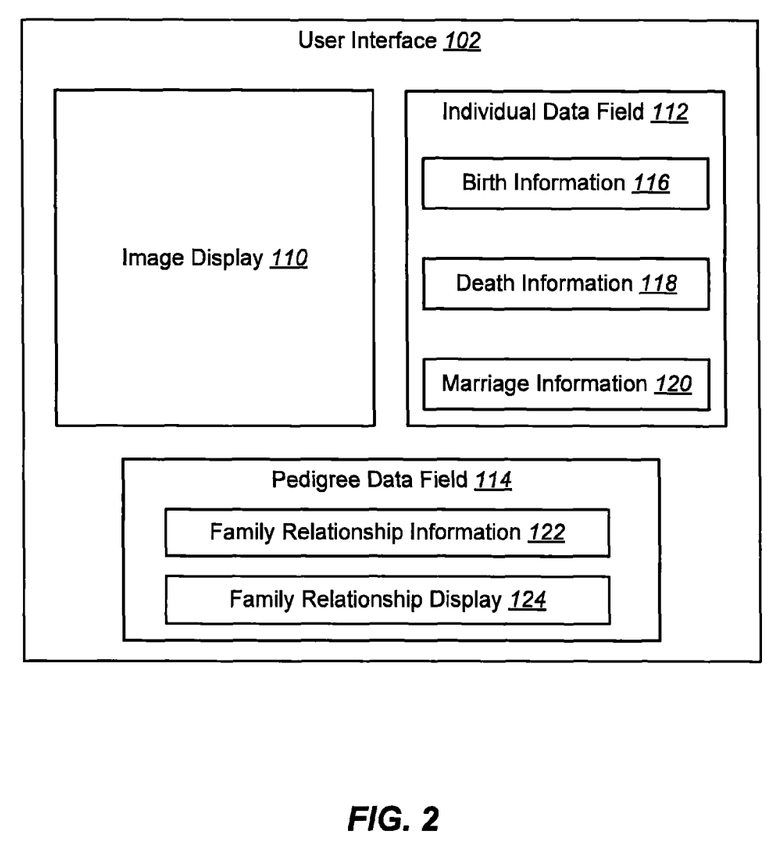
FIG. 2 is a block diagram illustrating one embodiment of an user interface in which the present systems and methods may be implemented.

Referring to FIG. 2, a user interface 102 may include a digital image display 110, an individual data field 112, and a pedigree data field 114. OCR data representing at least a portion of a digital image of a family history document (i.e., a digitized family history document) may be mapped to the digital image being displayed on a screen or window as part of the image display 110. The digital image visible on image display 110 may be overlaid with indicators or markings (e.g., underlining or highlighting) that represents the locations of characters or words in the digital image that have been captured in the OCR process. In at least one example, selecting the overlaid indicator or marking provides selection or capturing of the OCR data that is mapped to the digital image, and the selected OCR data is entered into one or more of the data fields 112, 114. The operator may view the OCR data that is entered into the fields 112, 114 and compare that entered data to what is shown in the digital image in image display 110 to confirm that the OCR data is correct (e.g., correct spelling, date, etc.). In some examples, the client device 100 may conduct automated checking for accuracy of at least some of the OCR data entered into the fields 112, 114 (e.g., correct spelling of names and places, and correct dates based on other dates available for an individual).

The individual data field 112 may include a plurality of fields including, for example, fields related to birth information 116, death information 118, and marriage information 120 for one or more individual names identified in the image display 110. The birth, death, and marriage information fields 116, 118, 120 may permit input, whether manual or automatic, of information such as dates, locations, and, in the case of marriage information, which of a plurality of marriages it is for a given individual. Information may be input into the individual data field 112 either manually by the operator who observes that information in the image display 110 or another family history document available outside of the user interface 102.

In some arrangements, at least some of the information provided in the individual data fields 112 may be automatically input by the pedigree module 104. The pedigree module may identify characters, words or names from the digital image that may be applicable to the individual data fields 112, and automatically populate any one of the birth, death and marriage information fields 116, 118, 120 using data from the OCR copy. After the individual data fields 112 have been automatically populated, the operator may manually confirm the accuracy of that automatically imported data and provide some indication (e.g., highlighting or underlining) at the user interface 102 whether the data in the individual data field 112 is correct.

The pedigree data field 114 may include family relationship information 122 and family relationship displays 124. The pedigree data field 114 may include at least one field for automatically or manually inputting family relationship information about one or more individuals represented on the image display 110 or another family history document separate from the user interface 102. The family relationship information 122 may be provided as a operator-selectable list of possible family relationship options such as, for example, son, daughter, husband, wife, grandparent, etc. Once the operator selects the correct family relationship for a given individual, the family relationship information 122 is complete. In other arrangements, the pedigree module 104 may, at least in part, automatically enter the family relationship information 122 based on information collected or otherwise identified in the image display 110.

The family relationship display 124 may include a visual display of various family relationships for one or more individuals listed in the family history document that is shown in the image display 110. The family relationship display 124 may include, for example, a pedigree chart that represents a parent/child relationship. In at least some examples, selecting any one of the individuals in the family relationship display 124 may activate the individual data field 112 to permit input of information specific to that individual such as, for example, birth, death, or marriage information 116, 118, 120, respectively. In some examples, the family relationship information 122 is a prerequisite entry at the user interface 102 to being able to aggregate the individual data at the individual data field 112.

Figure 3:
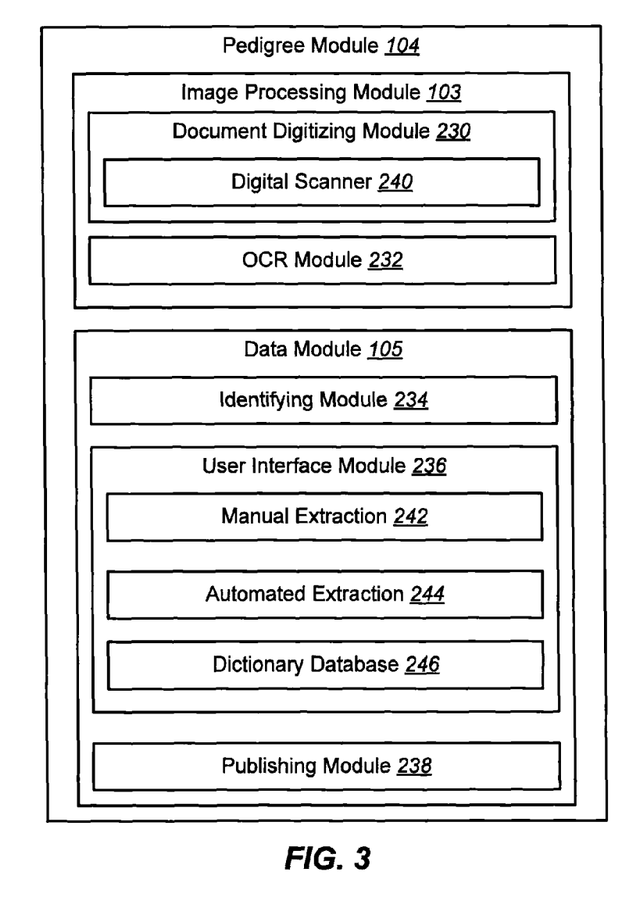
FIG. 3 is a block diagram illustrating one embodiment of an pedigree module in which the present systems and methods may be implemented.

Referring now to FIG. 3, the pedigree module 104 may include an image processing module 103 and a data module 105. The image processing module 103 may include a document digitizing module 230 and an OCR module 232. The data module 105 may include an identifying module 234, a user interface module 236, and a publishing module 238. In some arrangements, the data module 105 is referred to as the pedigree module. In other arrangements, at least some portions of the image processing module 103 may be extracted from the pedigree module 104 and function separately. In at least one example, the image processing module 103 is entirely separate from the client 100. The pedigree module 104 referenced in other figures and through this disclosure may or may not include functionality related to digitizing a family history document (i.e., creating a digital image) or creating an OCR copy of the digital image.

The document digitizing module 230 may include capability to convert a family history document into a digital format. The digital scanner 240 may be one device or system that provides digitization of the family history document. Many types of scanners and other devices are possible for use in the document digitizing module 230 to convert the family history document into a digital format.

The OCR module 232 may be operated on the digitized document produced by the document digitizing module 230 to create an OCR copy having OCR data that represents the family history document. Typically, OCR data in an OCR copy is searchable using many common computerized search techniques.

The identifying module 234 may operate to identify certain types of data in the OCR copy resulting from the OCR module 232. The identifying module 234 may identify, for example, a name of an individual, dates, key terms such as, for example, birth, death, marriage, etc., and family relationship information. The identifying module 234 may highlight or otherwise mark certain data in the digital image that may be relevant for either automatic or manual aggregating as extracted data for an individual from a family history document.

The user interface module 236 may include manual extraction 242, automated extraction 244, and a dictionary database 246. At least some of the manual extraction 242 may be used to help operate and control the user interface 102. Some operations of the automated extraction 244 may help populate certain fields at the user interface such as, for example, the individual data field 112 and pedigree data field 114. Some aspects of the automated extraction 244 may occur in response to manual input, such as operation of the manual extraction 242.

The dictionary database 246 may operate to either automatically or in response to a manual input to check the spelling or provide a definition of certain terms in the OCR copy. In one example, the dictionary database 246 may include historical data about name spellings based on birth year and birth location. The dictionary database 246 may provide at least one suggested correct spelling based on information from the dictionary database 246. The dictionary database 246 may be integral with the pedigree module 104. The dictionary database 246 may be particularly useful in suggesting to the human operator when the OCR data might be incorrect.

The publishing module 238 may operate to publish the manual and automated extracted data from the user interface module 236 by operation of the user interface 102 in a format that is searchable. The publishing module 238 may actively or passively transfer data to other databases, systems or modules via, for example, a network or the Internet.

Figure 4:
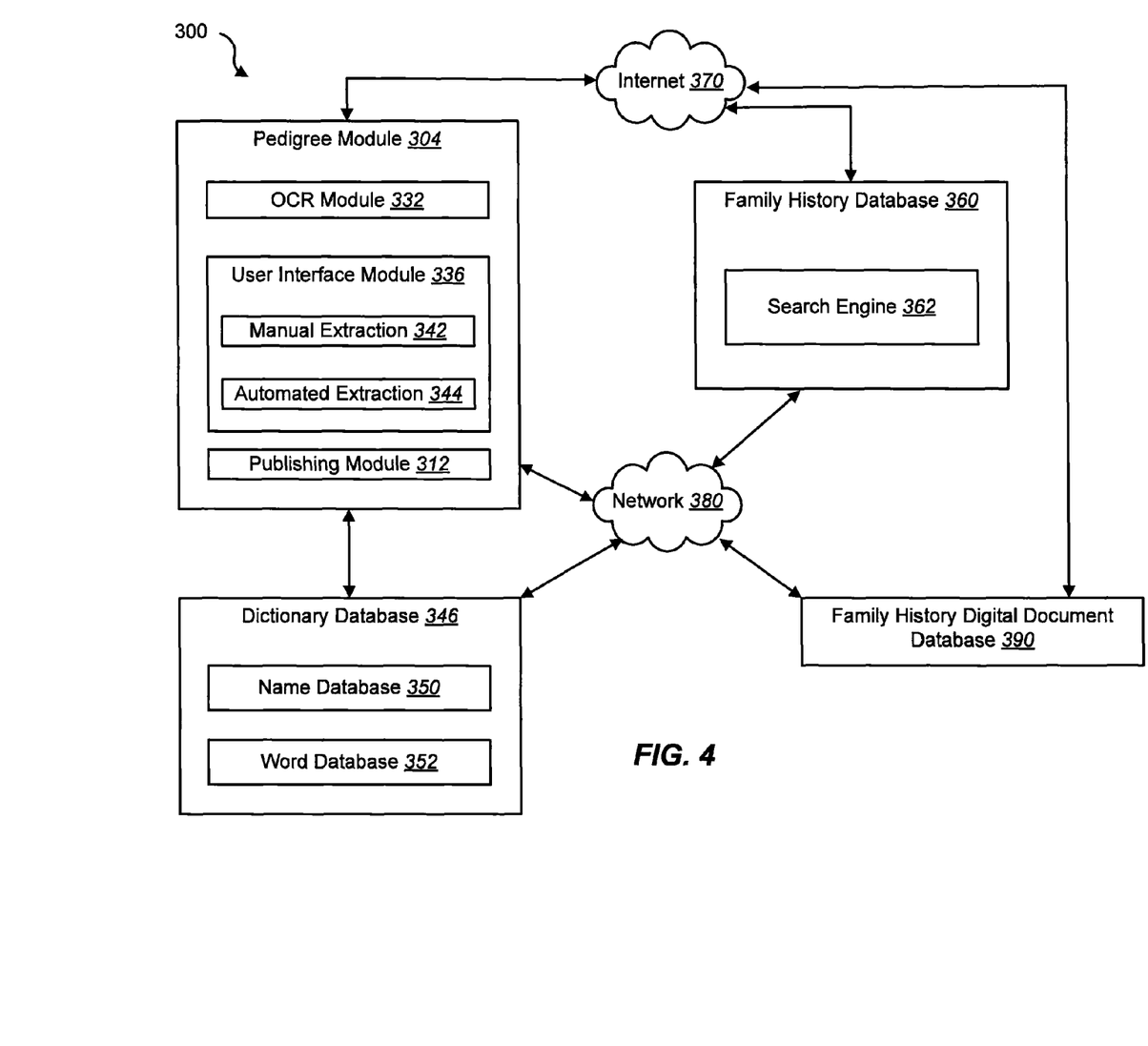
FIG. 4 is a block diagram illustrating another embodiment of a pedigree module communicating with a plurality of databases across a network and the Internet.

Referring now to FIG. 4, a system 300 may include a pedigree module 304, a dictionary database 346, a family history database 360, and a digital family history document database 390 that are interconnected via a network 380. At least some of the databases 346, 360, 390 may be interconnected via the Internet 370. Some of the databases 346, 360, 390 may be connected directly to the pedigree module 304. As discussed above, in at least some examples, functions of the OCR module 332 and functions related to creating a digital copy of a family history document may be separated from the pedigree module 304.

The pedigree module 304 may include an OCR module 332, a user interface module 336, and a publishing module 312. The user interface module 336 may include manual extraction 342 and automated extraction 344 of data related to an individual included in a family history document that has been digitized and made available in the family history digital document database 390 and later converted to an OCR copy by the OCR module 332. The pedigree module 304 may have the same or similar capability as described above related to pedigree module 104, with exception of having the dictionary database 346 and family history digital document database 390 provided as separate databases from the pedigree module 304. Further, the features and functionality of identifying module 234 may be integrated into one or both of the OCR module 332 and user interface module 336.

Data available in the family history database 360, dictionary database 346, and family history digital document database 390 may be available to each other or to the pedigree module 304 over the network 380. Any of the databases 360, 346, 390 or the pedigree module 304 may be accessible over the internet 370.

The family history database 360 may include a family history system similar to Ancestry.com® or FamilySearch.org™. The family history database 360 may include a search engine 362 that provides searching of the databases 346, 390 as well as extracted data available via the publishing module 312. In at least some arrangements, the pedigree module 304 may be integrated into the family history database 360.

Figure 5:
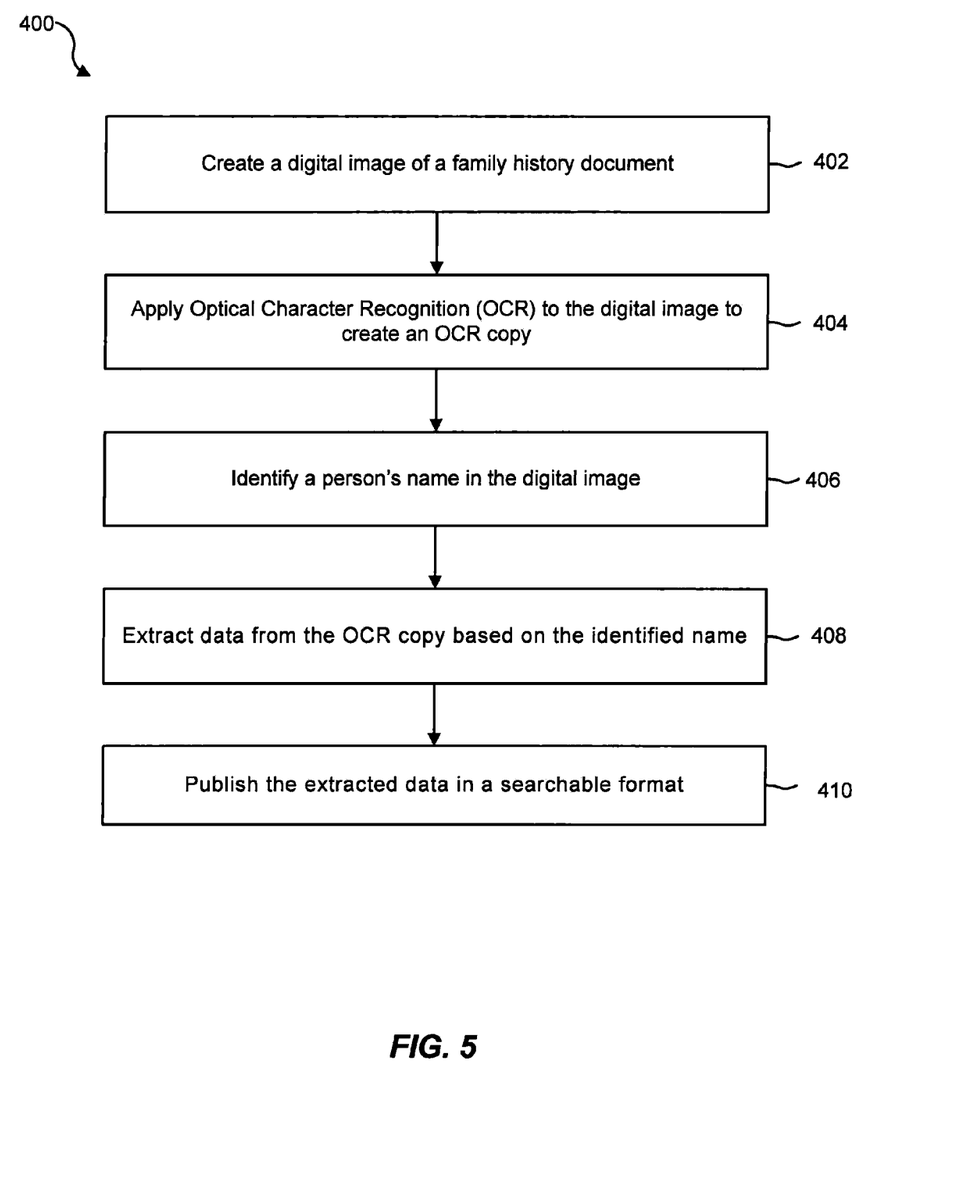
FIG. 5 is a flow diagram illustrating one embodiment of a method for extracting personal information for a family history document.

Several example methods of extracting personal information from a family history document are now described with reference to FIGS. 5-7. In the example shown in FIG. 5, the method 400 may be implemented by a server or other system. In particular, the method 400 may be implemented by a computer, a computing device, or a computer program product. In one example, the method 400 may be implemented using any of the user interfaces 102 and pedigree modules 104, 304 described above.

In one configuration, a digital image of a family history document may be created in a first operational step 402. Optical character recognition (OCR) may be applied to the digital image to create an OCR copy of the family history document in a second operational step 404. In a third operational step 406, a person's name is identified in the digital image. Data may be extracted from the OCR copy related to the person in a fourth operation step 408. The extracted data may also include at least one of a family relationship indicators, a birth date or place, a death date or place, or a marriage date or place for the person. The extracted data may be visible in the digital image and confirmed accurate by an operator or automatically based on databases of information accessible by the system. In a fifth operational step 410, the extracted data is published in a searchable format.

Figure 6:
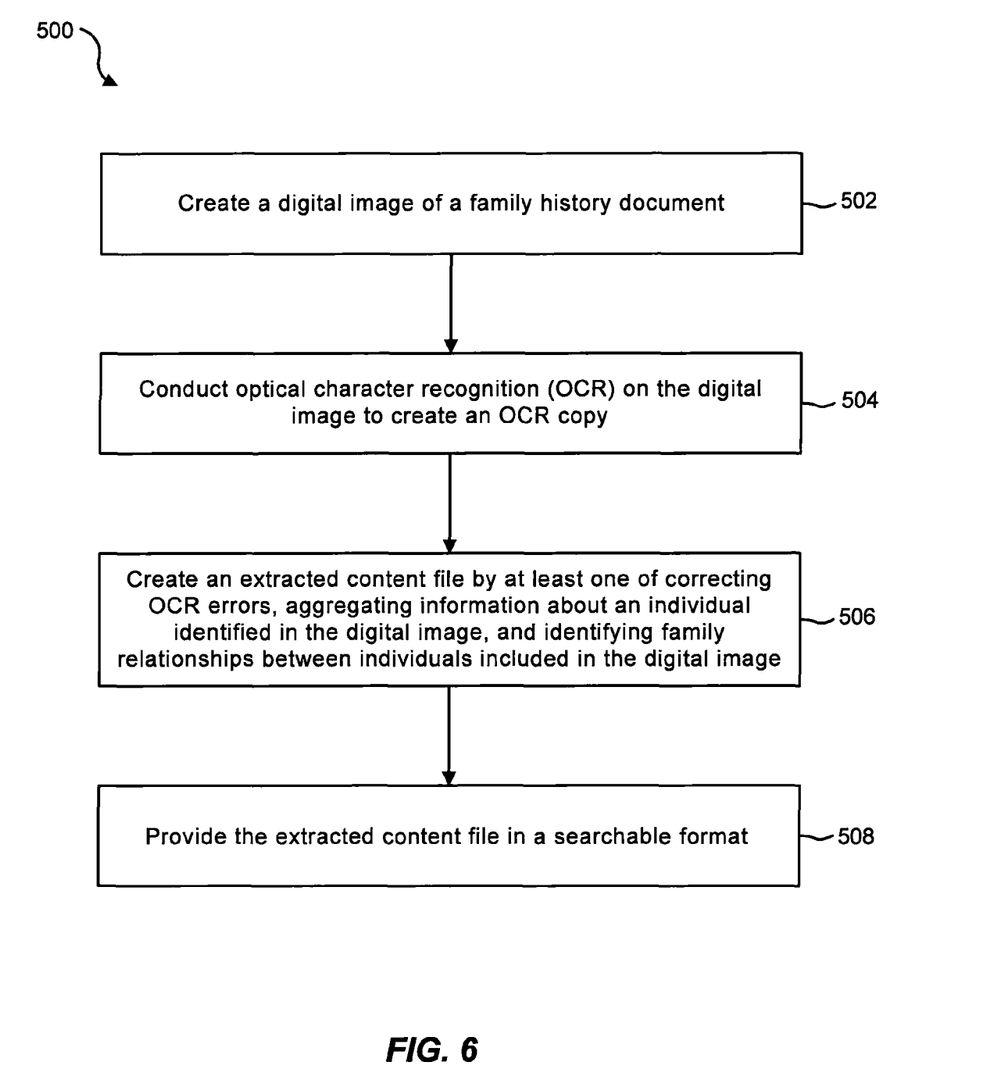
FIG. 6 is a flow diagram illustrating another embodiment of a method for extracting personal information from a family history document.

Referring to FIG. 6, another method 500 includes creating a digital image of a family history document in a first operational step 502. A second operational step 504 may include conducting optical character recognition (OCR) on the digital image to create an OCR copy. An extracted content file may be created by, for example, correlating OCR errors, aggregating information about an individual identified in the digital image, and identifying family relationships between individuals included in the digital image in a third operational step 506. In a fourth operational step 508, the extracted content file is provided in a searchable format.

Figure 7:
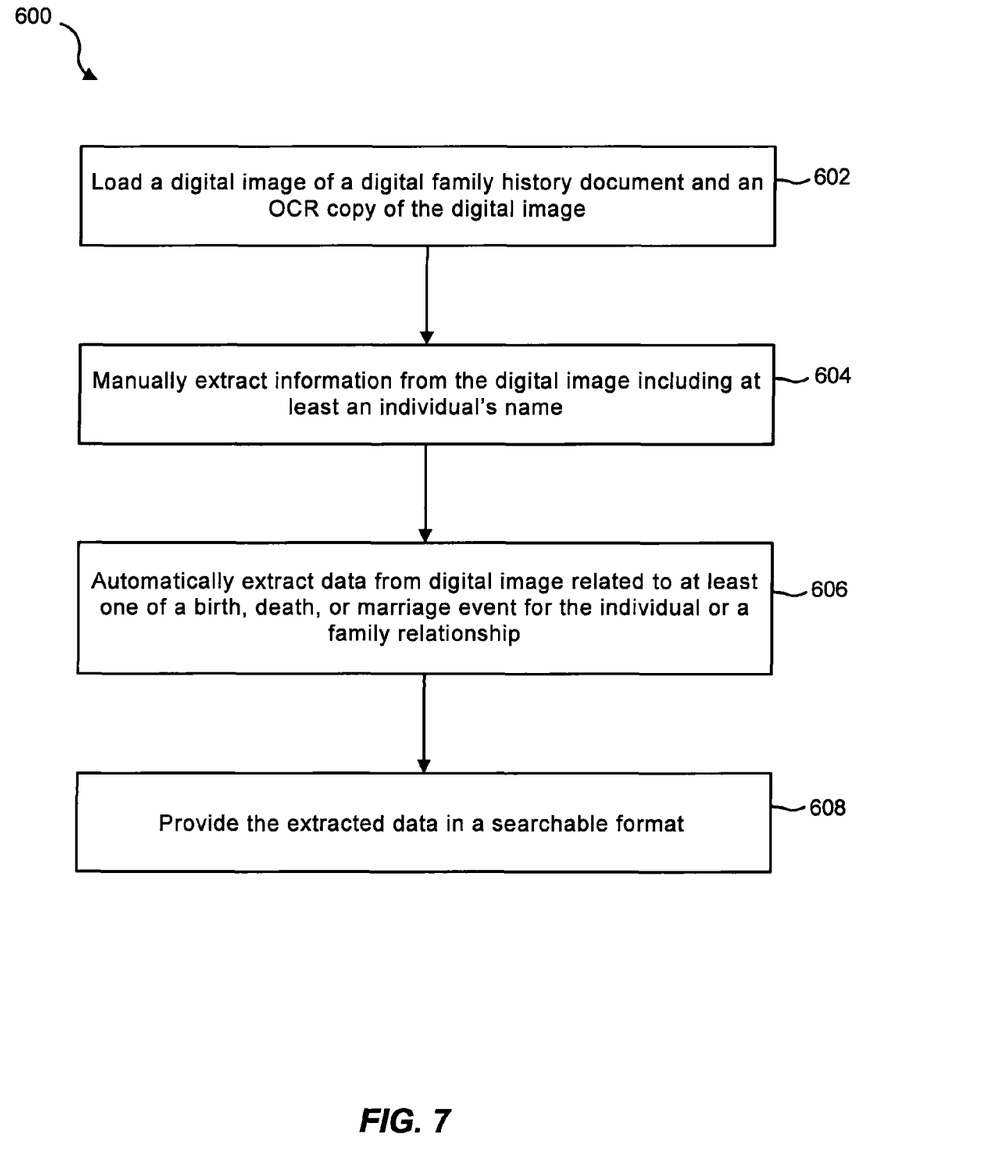
FIG. 7 is a flow diagram illustrating one embodiment of a method for extracting personal information for a family history document.

In further example method 600 shown in FIG. 7, an OCR copy and a digital image of a family history document are loaded in a first operational step 602. A second operational step 604 includes manually extracting information from the digital image including at least an individual's name. The manually extracted data may include at least one of a family relationship, birth information, death information, or marriage information for an individual identified in the digital image. A third operational step 606 includes automatically extracting information related to at least one of a birth, death, or marriage event or a family relationship for the individual using data in the digital image. The step of extracting information may include extracting data from the OCR copy that is mapped to the information in the digital image. The extracted information is provided in a searchable format in a fourth operational step 608.

Referring again to the user interface 102 of FIG. 2, the operator may move between the image display 110, individual data field 112, and pedigree data field 114 using a mouse in one example. The operator may click within any one of the individual data field 112 or pedigree data field 114 to create a new person. The operator can click on highlighted or otherwise marked characters in the image display 110 to add that marked word or data as information for the new person in either the individual data field 112 or pedigree data field 114. Typically, clicking on the highlighted/marked characters digital image selects data from the OCR copy, which OCR characters are mapped to the digital image, to add information to the individual data field 112. For example, the operator may add a new child in the pedigree data field 114, then click on the first name of the child located in the image display 110 to add that piece of information in the individual data field 112 or the pedigree data field 114.

The pedigree module 104 may be operable to automatically check the accuracy of names, places and dates entered within the image display 110, individual data field 112, and pedigree data field 114 against one or more dictionary or similar databases. This step of automatically checking accuracy of information is essentially checking the accuracy of the OCR copy. The pedigree module 104 may provide examples of likely possibilities as well as alerting the operator if no match is found by providing additional marking to the particular text being checked. At this point, the operator may, for example, click the entry and make corrections to the OCR data as needed in the image display 110 or the individual data field 112 or pedigree data field 114.

When the operator highlights a name in the image display 110 (i.e., by clicking on a name) the pedigree module 104 may be operable to look at the surrounding content of OCR data to attempt to automatically identify additional information about the individual. Any appropriate information that is identified such as, for example, last name, birth date and place, or death information is then automatically aggregated into the individual data fields 112 for that individual. The operator may then review the automated results and make corrections as needed.

When adding a new individual, the operator may click on an existing individual and select from a menu of possible family relationships for the new individual relative to the existing individual. This manual selection of family relationship by the operator inherently saves as extracted data the relationship information between the two individuals as part of the process of adding each new individual via the user interface.

Some family history documents may use an identification system throughout the entire document to link together the same individual who appears in multiple parts of the document. The systems and methods disclosed herein may use this characteristic of a particular family history document to automatically link multiple generations of individuals together when data is extracted either automatically or manually from the digital image and stored as an extracted data file. The systems and methods may also aggregate information about a single individual from various places in a family history document.

Figure 8:
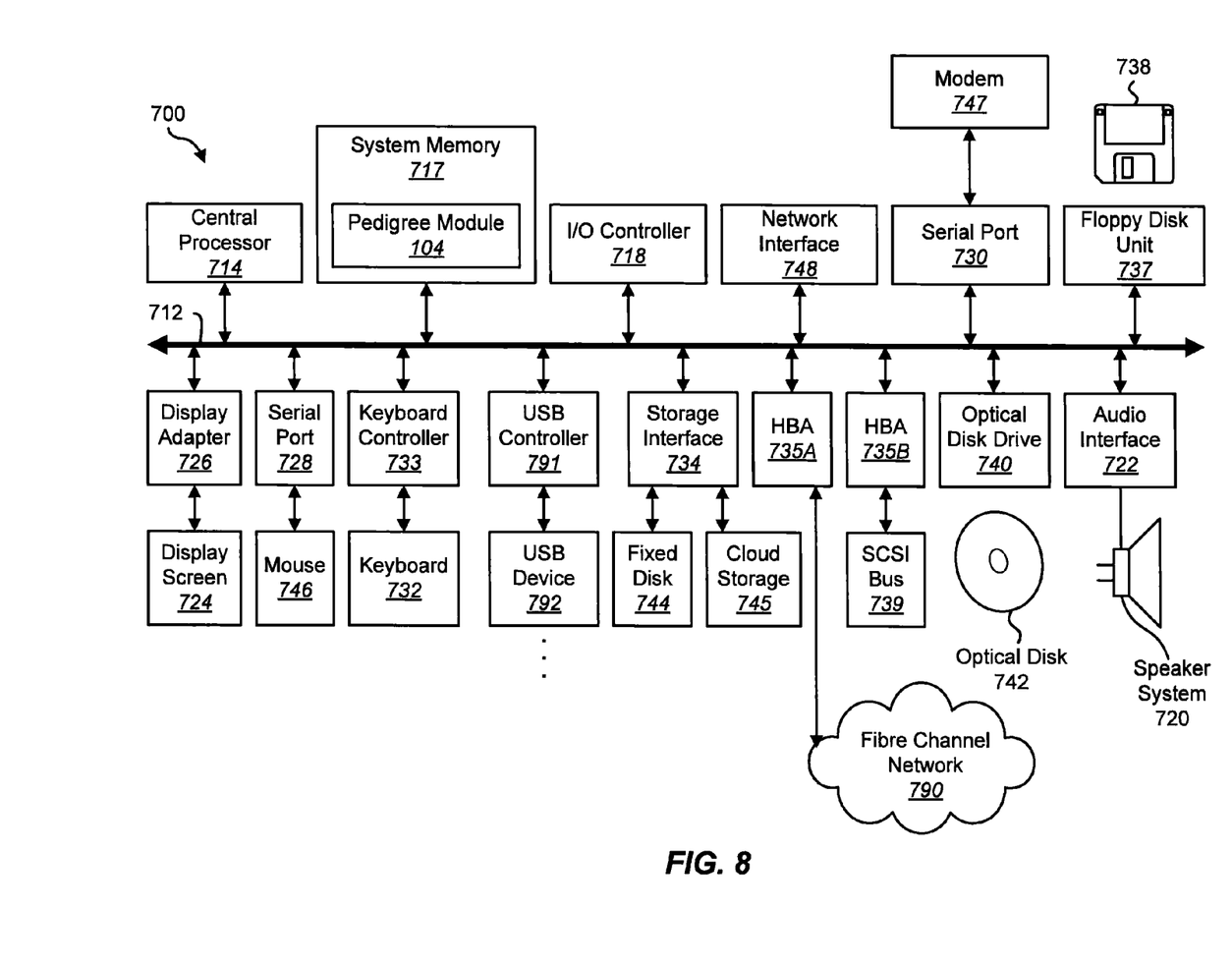
FIG. 8 is a block diagram depicting a computer system suitable for implementing the present systems and methods.

FIG. 8 depicts a block diagram of a computer system 700 suitable for implementing the present systems and methods. Computer system 700 includes a bus 712 which interconnects major subsystems of computer system 700, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 790), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the pedigree module 104 to implement the present systems and methods may be stored within the system memory 717. Applications resident with computer system 700 are generally stored on and accessed via a computer readable medium, such as a hard disk drive (e.g., fixed disk 744), a cloud storage 745, an optical drive (e.g., optical drive 740), a floppy disk drive 737, or other storage medium. Additionally, applications can be in the form of electronic signals modulated in accordance with the application and data communication technology when accessed via network modem 747 or interface 748.

Storage interface 734, as with the other storage interfaces of computer system 700, can connect to a standard computer readable medium for storage and/or retrieval of information, such as a fixed disk drive 744. Fixed disk drive 744 may be a part of computer system 700 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable medium such as one or more of system memory 717, fixed disk drive 744, optical disk 742, or floppy disk 738. The operating system provided on computer system 700 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
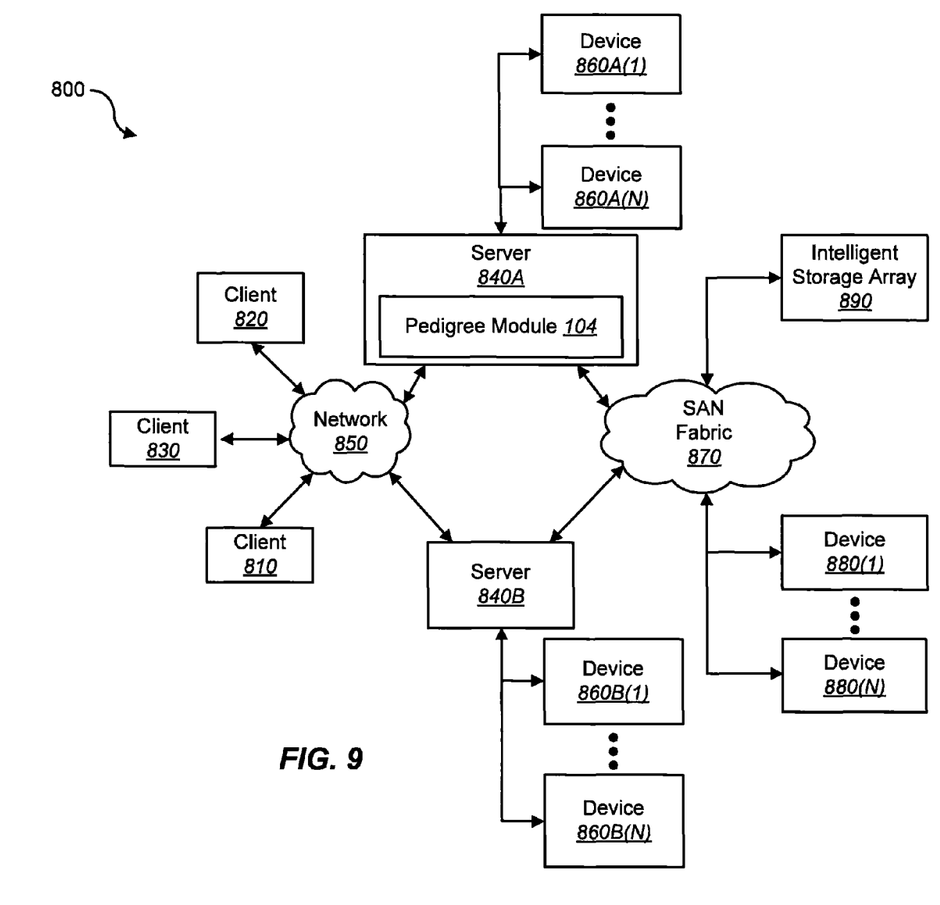
FIG. 9 is a block diagram depicting a network architecture in which client systems, as well as storage servers (any of which can be implemented using computer system), are coupled to a network.

FIG. 9 is a block diagram depicting a network architecture 800 in which client systems 810, 820 and 830, as well as storage servers 840A and 840B (any of which can be implemented using client system 810), are coupled to a network 850. In one embodiment, the pedigree module 104 may be located within a storage server 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 700, modem 747, network interface 748 or some other method can be used to provide connectivity from each of client systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for extracting personal information from a family history document, comprising:
    applying optical character recognition (OCR) to a digital image of a family history document to create an OCR copy;
    identifying a person's name in the digital image;
    extracting name data from the OCR copy representing the name;
    confirming accuracy of the extracted name data;
    publishing the extracted name data in a searchable format;
    identifying a family relationship indicator corresponding to the identified person's name in the digital image, and extracting relationship data from the OCR copy representing the family relationship indicator.

2. The method of claim 1, further comprising identifying at least one of a birth date, a death date, and a marriage date corresponding to the identified person's name in the digital image, and extracting data from the OCR copy representing the identified birth date, death date, or marriage date.

3. The method of claim 2, further comprising automatically associating the at least one of a birth date, a death date, and a marriage date with the person's name.

4. The method of claim 3, further comprising using predicative algorithms to automatically associate the at least one of a birth date, a death date, and a marriage date with the person's name.

5. The method of claim 1, wherein extracting name data includes highlighting the identified name, manually selecting the highlighted name, and mapping to data in the OCR copy representing the identified name.

6. The method of claim 1, further comprising manually correcting incorrect OCR characters from the OCR copy.

7. The method of claim 1, further comprising comparing the person's name with a database of names to assess correct spelling of the person's name, wherein the names in the database are organized by at least one of a historical time period, a gender, and a location.

8. The method of claim 2, further comprising identifying errors in at least one of the birth date, death date, and marriage date by comparison between at least two of the birth date, death date, and marriage date.

9. A computer-implemented method for extracting personal information from a family history document, comprising:
    applying optical character recognition (OCR) to a digital image of a family history document to create an OCR copy;
    identifying a person's name in the digital image;
    extracting name data from the OCR copy representing the name;
    confirming accuracy of the extracted name data;
    publishing the extracted name data in a searchable format;
    identifying at least one of a birth date, a death date, and a marriage date corresponding to the identified person's name in the digital image, and extracting data from the OCR copy representing the identified birth date, death date, or marriage date;
    identifying errors in at least one of the birth date, death date, and marriage date by comparison between at least two of the birth date, death date, and marriage date.

10. The method of claim 9, further comprising automatically associating the at least one of a birth date, a death date, and a marriage date with the person's name.

11. The method of claim 10, further comprising using predicative algorithms to automatically associate the at least one of a birth date, a death date, and a marriage date with the person's name.

12. The method of claim 9, wherein extracting name data includes highlighting the identified name, manually selecting the highlighted name, and mapping to data in the OCR copy representing the identified name.

13. The method of claim 9, further comprising manually correcting incorrect OCR characters from the OCR copy.

14. The method of claim 9, further comprising comparing the person's name with a database of names to assess correct spelling of the person's name, wherein the names in the database are organized by at least one of a historical time period, a gender, and a location.

15. A computer-implemented method for extracting personal information from a family history document, comprising:
    applying optical character recognition (OCR) to a digital image of a family history document to create an OCR copy;
    identifying a person's name in the digital image;
    extracting name data from the OCR copy representing the name, wherein extracting name data includes highlighting the identified name, manually selecting the highlighted name, and mapping to data in the OCR copy representing the identified name;
    confirming accuracy of the extracted name data;
    publishing the extracted name data in a searchable format.

16. The method of claim 15, further comprising identifying at least one of a birth date, a death date, and a marriage date corresponding to the identified person's name in the digital image, and extracting data from the OCR copy representing the identified birth date, death date, or marriage date, and automatically associating the at least one of a birth date, a death date, and a marriage date with the person's name.

17. The method of claim 16, further comprising using predicative algorithms to automatically associate the at least one of a birth date, a death date, and a marriage date with the person's name.

18. The method of claim 15, further comprising manually correcting incorrect OCR characters from the OCR copy.

19. The method of claim 15, further comprising comparing the person's name with a database of names to assess correct spelling of the person's name, wherein the names in the database are organized by at least one of a historical time period, a gender, and a location.

\* \* \* \* \*